United States Patent
Li et al.

(10) Patent No.: US 7,907,540 B2
(45) Date of Patent: Mar. 15, 2011

(54) RELAYS IN WIRELESS COMMUNICATION NETWORKS

(75) Inventors: Qinghua Li, San Ramon, CA (US); Xintian E. Lin, Palo Alto, CA (US)

(73) Assignee: Intel Corporation, Santa Clara, CA (US)

( * ) Notice: Subject to any disclaimer, the term of this patent is extended or adjusted under 35 U.S.C. 154(b) by 107 days.

(21) Appl. No.: 11/959,351

(22) Filed: Dec. 18, 2007

(65) Prior Publication Data

US 2010/0039947 A1 Feb. 18, 2010

(51) Int. Cl.
*H04J 1/16* (2006.01)

(52) U.S. Cl. ............ 370/252; 370/315; 370/331; 455/9; 455/442; 455/11.1

(58) Field of Classification Search .................. 370/252, 370/315, 331, 338; 455/9, 11.1, 7, 436
See application file for complete search history.

(56) References Cited

U.S. PATENT DOCUMENTS

| | | | |
|---|---|---|---|
| 6,473,617 B1 * | 10/2002 | Larsen et al. | 455/446 |
| 2006/0252367 A1 * | 11/2006 | Haartsen | 455/11.1 |
| 2007/0213065 A1 * | 9/2007 | Kang et al. | 455/442 |
| 2007/0280172 A1 * | 12/2007 | Tan et al. | 370/335 |
| 2008/0009241 A1 * | 1/2008 | Do et al. | 455/9 |
| 2008/0019321 A1 * | 1/2008 | Kim et al. | 370/332 |
| 2008/0108369 A1 * | 5/2008 | Visotsky et al. | 455/455 |
| 2009/0047898 A1 * | 2/2009 | Imamura et al. | 455/7 |

* cited by examiner

*Primary Examiner* — Ricky Ngo
*Assistant Examiner* — Rasheed Gidado
(74) *Attorney, Agent, or Firm* — Cool Patent, P.C.; Joseph P. Curtin

(57) ABSTRACT

Methods and apparatus for transmitting packets in wireless communication networks are disclosed. The methods include a relay mobile station measuring channel quality between the relay mobile station and a destination mobile station in response to a request for relay mobile stations from a base station The relay mobile station reports a channel quality indicator to the base station if the channel quality for a link between the base station and the destination mobile station via the relay mobile station is greater than a predetermined channel quality. The base station determines the relay mobile station that provides an optimal route for transmitting the packets from the base station to the destination mobile station.

18 Claims, 5 Drawing Sheets

Fig. 3
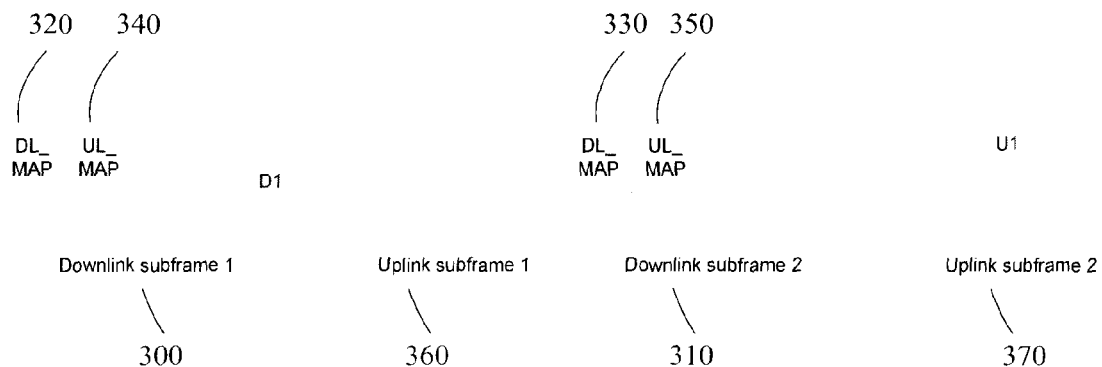
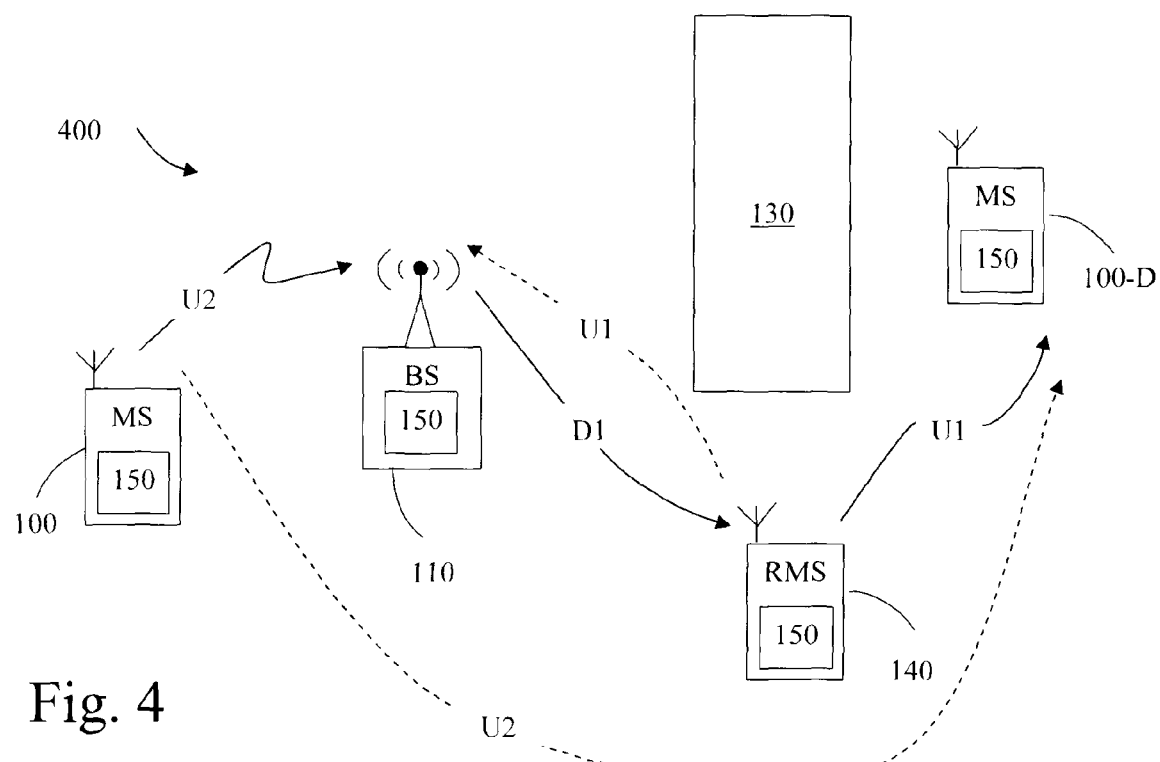
Fig. 4

RELAYS IN WIRELESS COMMUNICATION NETWORKS

FIELD OF THE INVENTION

Embodiments of the present invention relate generally to relays in wireless communication networks.

BACKGROUND OF THE INVENTION

Wireless communication networks often comprise a base station in communication with one or more mobile stations, also known as clients or subscriber stations. It is well known to use a relay to route signals between the base station and the mobile stations to increase the capacity, or throughput, and the reliability of the wireless communication networks. Relays are often used, for example, when the link between the base station and the mobile station is poor because of an obstacle, such as a building, in the Line of Sight (LOS) between the base station and the mobile station.

The Institute of Electronic and Electrical Engineers (IEEE) 802.16j standard defines a Mobile Multihop Relay-based (MMR) network architecture for relays in which the relays are all base stations. The relays functionally serve as aggregating points for the collection and distribution of traffic from and to mobile stations associated with the relays. However, certain concepts of other IEEE standards, such as the concept of connection and the associated packet construction mechanism defined in the IEEE 802.16d/16e standards, may potentially create bottlenecks and limit the overall capacity of the network.

Another IEEE standard having the objectives of improved capacity and reliability is 802.16m, which is the Worldwide Interoperability for Microwave Access (WiMAX) 2 counterpart of 802.16j. However, 802.16j can not merge with 802.16m due to fundamental Media Access Control (MAC) differences. 802.16m is an extension of 802.16e and focuses on base stations without relays. Therefore, the 802.16m standard may not be unable to enjoy the performance gains provided by relays.

BRIEF DESCRIPTION OF THE DRAWINGS

In order that the invention may be readily understood and put into practical effect, reference now will be made to embodiments of the present invention with reference to the accompanying drawings, wherein like reference numbers refer to identical elements. The drawings are provided by way of example only, wherein:

FIG. 3 is a schematic subframe diagram illustrating some embodiments of the present invention.

FIG. 4 is a schematic diagram illustrating wireless communication devices communicating in a wireless communication network according to alternative embodiments of the invention.

Figure 1:
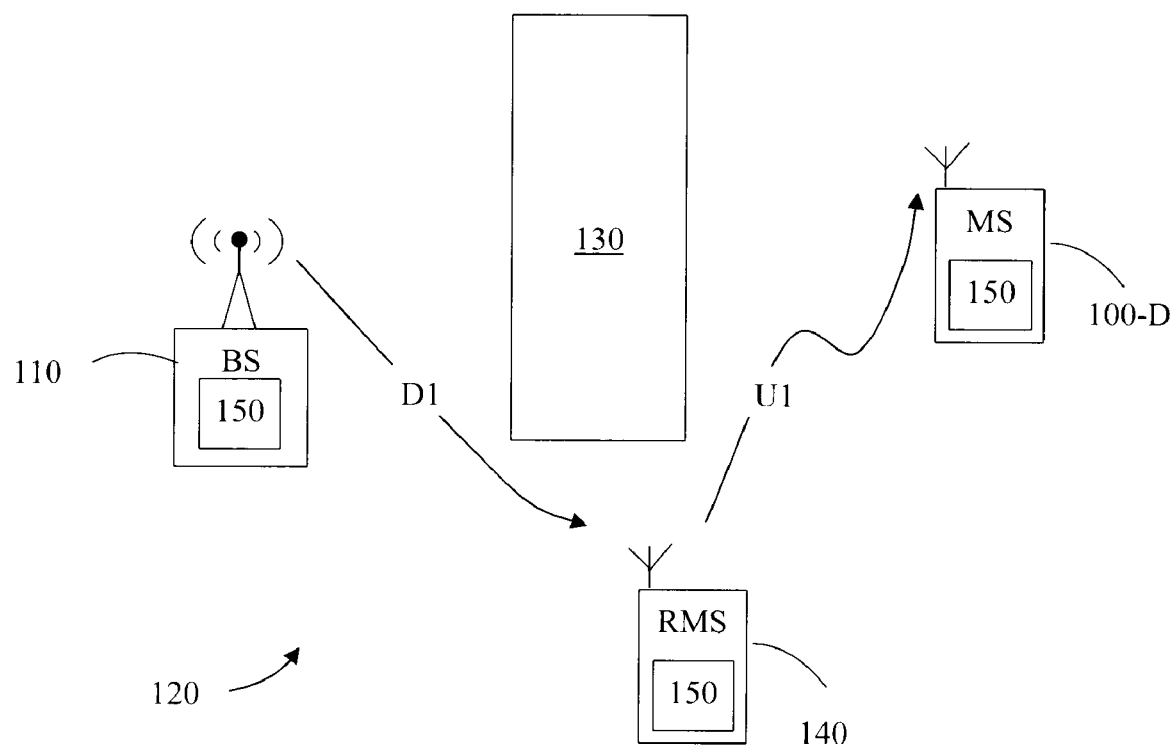
FIG. 1 is a schematic diagram illustrating wireless communication devices communicating in a wireless communication network according to embodiments of the invention.

Skilled addressees will appreciate that elements in the figures are illustrated for simplicity and clarity and have not necessarily been drawn to scale. For example, the relative dimensions of some of the elements in the figures may be distorted to help improve understanding of embodiments of the present invention.

DETAILED DESCRIPTION

Before describing embodiments that are in accordance with the present invention in detail, it should be understood that the embodiments reside primarily in combinations of method steps and apparatus components related to transmitting packets in wireless communication networks via relay mobile stations. Accordingly, the apparatus components and method steps have been represented where appropriate by conventional symbols in the drawings, showing only those specific details that are relevant to understanding the embodiments of the present invention, such that the disclosure is not obscured with details that will be readily apparent to those of ordinary skill in the art.

In this specification, the terms "comprises," "comprising," "includes", "including" or any other variation thereof, are intended to cover a non-exclusive inclusion, such that a method, process, article or apparatus that comprises a list of elements does not include only those elements, but may include other elements not expressly listed or inherent to such a method, process, article or apparatus. An element preceded by, for example, "comprises a . . . " does not, without more constraints, preclude the existence of additional identical elements in the method, process, article or apparatus that comprises the element.

It will be appreciated that embodiments of the invention herein described may be comprised of one or more conventional processors and unique stored program instructions that control the one or more processors to implement, in conjunction with certain non-processor circuits, some, most, or all of the functions of transmitting packets in wireless communication networks via relay mobile stations as herein described. The non-processor circuits may include, but are not limited to, a radio receiver, a radio transmitter, signal drivers, clock circuits, power source circuits, and user input devices. As such, these functions may be interpreted as a method for transmitting packets in wireless communication networks via relay mobile stations. Alternatively, some or all functions could be implemented by a state machine that has no stored program instructions, or in one or more application specific integrated circuits (ASICs), Field-Programmable Gate Arrays (FPGAs), or other dedicated circuitry, in which each function or one or more combinations of the functions are implemented as custom logic. A combination of the two approaches could also be used. Thus, methods and means for these functions have been described herein. Further, it is expected that one of ordinary skill in the art, when guided by the disclosure herein, will be readily capable of generating such software instructions, programs and integrated circuits with minimal experimentation.

With reference to FIG. 1, a schematic diagram illustrates an example of wireless communication devices 100-D, 110, and 140 communicating in a wireless communication network 120. In this example, the wireless communication devices comprise a base station (BS) 110 communicating with a destination mobile station (MS) 100-D via a relay mobile station (RMS) 140. Mobile stations are also known as, for example, subscriber stations or clients, but will be referred to herein as mobile stations. The wireless communication devices can be in the form of, but are not limited to, mobile telephones, notebook or laptop computers, personal digital assistants (PDAs), portable multimedia devices, mobile internet devices (MIDs), ultra mobile PCs (UMPCs), ultra mobile devices (UMDs) and other wireless communication devices. FIG. 1 also shows an obstacle 130, such as a building, located in the Line of Sight (LOS) path between the base station 110 and the destination mobile station 100-D. In accordance with embodiments of the present invention, another mobile station acts as the relay mobile station (RMS) 140 to improve performance as described in further detail hereinafter. Embodiments of the present invention can be implemented in, and are applicable to, the wireless communication devices 100-D, 110, 140, which comprise computer-readable program code components 150 configured to cause transmitting packets in wireless communication networks via relay mobile stations and which will be discussed in further detail hereinafter.

In accordance with embodiments of the present invention, instead of using base stations as relays, the functions of relays are conducted by the mobile stations. One observation is that wireless communication devices, such as laptop and notebook computers operating as mobile stations and requesting high data rates, are often in indoor environments coupled to a mains power supply. Such mobile stations having no power-consumption restrictions can provide the relay functions, for example, with appropriate operator incentives.

Consider the scenario illustrated in FIG. 1 wherein the link between the base station 110 and the destination mobile station 100-D is poor because of the obstacle 130 located in the LOS path between the base station 110 and the destination mobile station 100-D. However, the link between the base station 110 and the mobile station 140 and the link between the mobile station 140 and the destination mobile station 100-D have good qualities because the obstacle 130 is not in the LOS paths. In accordance with embodiments of the present invention, the base station 110 can ask the mobile station 140 to act as a relay and relay the traffic between the base station 110 and the destination mobile station 100-D.

Embodiments of the present invention in particular relate to mobile stations operating as relays in wireless communication networks employing the IEEE 802.16m standard. However, embodiments of the present invention are backwards compatible with the IEEE 802.16e standard and compatible with the IEEE 802.16j standard. The skilled addressee should appreciate that embodiments of the present invention are applicable to a wide range of wireless communication systems implementing various communication protocols, such as, but not limited to, Orthogonal Frequency Division Multiplexing (OFDM), Orthogonal Frequency Division Multiple Access (OFDMA), Frequency Division Multiple Access (FDMA), Time Division Multiple Access (TDMA), Code Division Multiple Access (CDMA), Space Division Multiple Access (SDMA), 3G Long-Term Evolution (3G LTE) and 3G Partnership Project LTE (3GPP LTE).

Methods for transmitting packets in wireless communication networks in which the relay link only uses uplink time slots according to embodiments of the present invention will now be described with reference to the general flow diagram shown in FIG. 2 and the schematic subframe diagram shown in FIG. 3.

Figure 2:
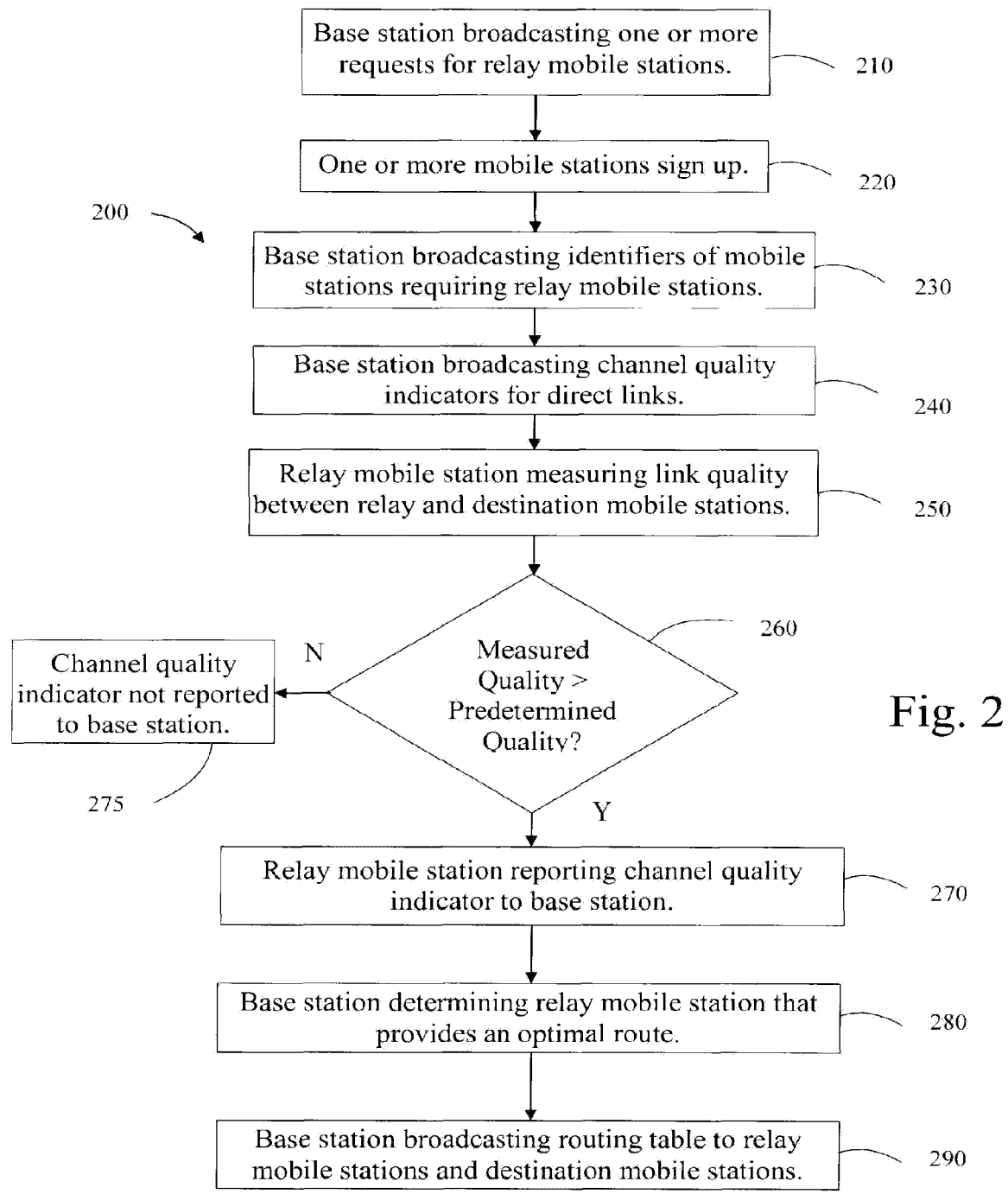
FIG. 2 is a general flow diagram illustrating methods of transmitting packets in wireless communication networks via relay mobile stations according to embodiments of the invention.

Referring to FIG. 2, a method 200 according to some embodiments of the invention comprises at 210 the base station 110 broadcasting one or more requests for relay mobile stations. At 220, the method 200 comprises one or more mobile stations 100 signing up for the tasks to be performed by relay mobile stations. According to some embodiments, incentives are offered to subscribers by the network operator to entice the subscribers to offer their mobile station as a relay mobile station. The method comprises at 230 the base station 110 broadcasting identifiers of the destination mobile stations 100-D for which a relay mobile station is required. According to some embodiments, the method 200 can further comprise at 240 the base station 110 broadcasting a channel quality indicator, such as the channel quality index (CQI), for the direct link (without a relay) between the base station 110 and each destination mobile station 100-D for which a relay mobile station is required. However, according to some embodiments, the base station 110 does not broadcast the channel quality indicator to reduce overhead. Whilst broadcasting of the identifiers and the CQIs are shown separately in FIG. 2, the skilled addressee will appreciate that the CQIs can alternatively be broadcast with their associated identifiers.

At 250, the method 200 comprises one or more relay mobile stations, such as relay mobile station 140, listening to the uplink transmissions of the mobile stations and measuring the channel quality between the relay mobile station 140 and the destination mobile station 100-D in response to the request for relay mobile stations from the base station 110. At 260, the method 200 comprises the relay mobile station comparing the quality of the relay channel with a predetermined channel quality. According to some embodiments, the predetermined channel quality is in the form of the quality of the direct link between the base station 110 and the destination mobile station 100-D. At 270, the method 200 comprises the relay mobile station reporting a channel quality indicator, such as the channel quality index (CQI), to the base station 110 if the channel quality for a link between the base station 110 and the destination mobile station 100-D via the relay mobile station 140 is greater than the predetermined channel quality, such as the channel quality for a direct link between the base station 110 and the destination mobile station 100-D. However, in embodiments in which the base station 110 does not broadcast the channel quality of the direct link in order to reduce overhead, other measures can be used for the predetermined channel quality. For example, if the relay route can deliver a data rate greater than a predetermined rate, such as 1 bit/second/Hz, the relay mobile station reports the channel quality indicator to base station 110. If the capacity of the measured channel is not higher than the predetermined channel quality, at 275 of the method 200, the channel quality indicator is not reported to the base station 110 by the relay mobile station. According to some embodiments, at 270, mobile stations can sign up for relaying data along with reporting the channel quality indicator. If this is done, step 220 of the method 200 can be skipped. The base station 110 receives the reported channel quality indicators for the various links from the relay mobile stations and the method 200 comprises at 280 the base station determining the relay mobile station that provides an optimal route for transmitting the packets from the base station 110 to the destination mobile station 100-D. At 290, the method 200 comprises the base station 110 broadcasting a routing table to the relay mobile stations and the destination mobile stations 100-D.

According to some embodiments, for a time-sharing scheme comprising no combined decoding, the method further comprises determining the relay mobile station that provides an optimal route based on transmission times. The optimal route is determined based on the transmission time between the base station 110 and the destination mobile station 100-D, (BS→D), the transmission time between the base station 110 and the relay mobile station 140, (BS→R) and on the transmission time between the relay mobile station 140 and the destination mobile station 100-D, (R→D) according to Equation 1:

$$\frac{1}{\text{channel capacity}(BS \to D)} - \frac{1}{\frac{1}{\text{channel capacity}(BS \to D)} - \frac{1}{\text{channel capacity}(R \to D)}} > \text{threshold}$$

in which the terms channel capacity (BS→D) etc. refers to the theoretical channel capacities for the respective links and the threshold is predetermined to compensate for the overhead of the relay mobile station. According to some embodiments, the theoretical channel capacity can be replaced by better estimates such as the highest data rate (or throughput) among all available schemes provided by the system.

According to other embodiments, combined encoding schemes are used and Equation 1 can be modified to take such encoding schemes into account. According to such embodiments, the method further comprises determining the relay mobile station that provides an optimal route based on Equation 2:

$$\frac{1}{CC(BS \to D)} - \frac{1}{CC(BS \to R) + CC(BS \to D)} - \frac{1}{CC(R \to D)} > \text{threshold}$$

in which CC represents the theoretical channel capacities. The theoretical channel capacities can be replaced by better estimates as described above.

Since IEEE 802.16m will be an extension of IEEE 802.16e and IEEE 802.16e transmissions are divided into downlink and uplink subframes, the relay schemes according to embodiments of the present invention are compatible with and will have minimum impact on IEEE 802.16e. To achieve this goal, according to some embodiments, the relay transmissions by the relay mobile station 140 only occur in the uplink subframe and look like normal uplink transmissions. This avoids interference from high-priority transmissions from the base station 110. In the uplink, the frequency/time allocation for the relay mobile station 140 is unique and the relay traffic to the destination mobile station 100-D is interference free in the service area.

Generally, the relay feature is considered as secondary to the transmissions of the base station 110. Embodiments of the present invention therefore avoid interference to the downlink transmission in which the base station delivers most of the data. Also, current IEEE 802.16e uplinks already consist of multiple simultaneous transmissions from mobile stations 100 and embodiments according to the present invention are therefore a good fit. For complexity reasons, a one-hop relay is desirable. However, it should be appreciated by the skilled addressee that embodiments of the present invention are not limited to one hop and multiple hops are readily envisaged.

FIG. 3 illustrates a first downlink subframe 300 and a second downlink subframe 310, each comprising a respective downlink map 320, 330 and a respective uplink map 340, 350. FIG. 3 also illustrates a first uplink subframe 360 and a second uplink subframe 370. With additional reference to FIG. 1, in the downlink relay, the base station 110 sends a packet D1 to both the relay mobile station 140 and the destination mobile station 100-D in the first downlink subframe 300. After receiving the packet D1 in the first downlink subframe 300, the relay mobile station 140 forwards the packet D1 to the destination mobile station 100-D in the second uplink subframe 370. The relay route, i.e., the relay mobile station and destination mobile station pair, is determined before the transmission as described above and is known both by the relay mobile station and the destination mobile station concerned. Therefore, once the destination mobile station 100-D sees a packet addressed to it in the 802.16e downlink header (i.e., the downlink map 320), the destination mobile station 100-D knows that there may be another packet U1 in the second uplink subframe 370 for it and the destination mobile station 100-D checks the uplink header (i.e., uplink map 340) for the reception of the relayed packet. Similarly, once the relay mobile station 140 sees the packet for the destination mobile station 100-D listed in the downlink header 320, the relay mobile station 140 picks up the packet. If a relay slot is allocated in the uplink map 340, the relay mobile station 140 sends the packet again in the second uplink subframe 370 using its relay slot allocated in the second uplink frame. The destination mobile station 100-D combines the two received signals, one from the base station 110 and one from the relay station 140, to improve performance. Consequently, the spectrum efficiency is doubled due to reduced path loss over the shortened distances between base station 110 and the relay mobile station 140 and between the relay mobile station 140 and the destination mobile station 100-D.

FIG. 4 illustrates a wireless communication network 400 similar to the wireless communication network 120 in FIG. 1. However, in this example there is another mobile station 100. In FIG. 4, desirable transmissions are shown in solid lines, whereas dashed lines represent interference. With reference to FIG. 4, if an uplink transmission from another mobile station 100 shares an uplink slot with the relay transmission from the relay mobile station 140, the interference between the relay and uplink transmissions needs to be addressed. Interference-mitigation schemes to remove the interference U1 from the relay mobile station 140 at the base station 110 are known. Therefore, only the interference U2 from the uplink transmission at the destination station 100-D needs to be considered.

Methods for transmitting packets in wireless communication networks in which the relay mobile station shares an uplink slot with an uplink transmission from another mobile station 100 according to embodiments of the present invention will now be described with reference to the general flow diagram shown in FIG. 5 and the schematic subframe diagram shown in FIG. 6.

Figure 5:
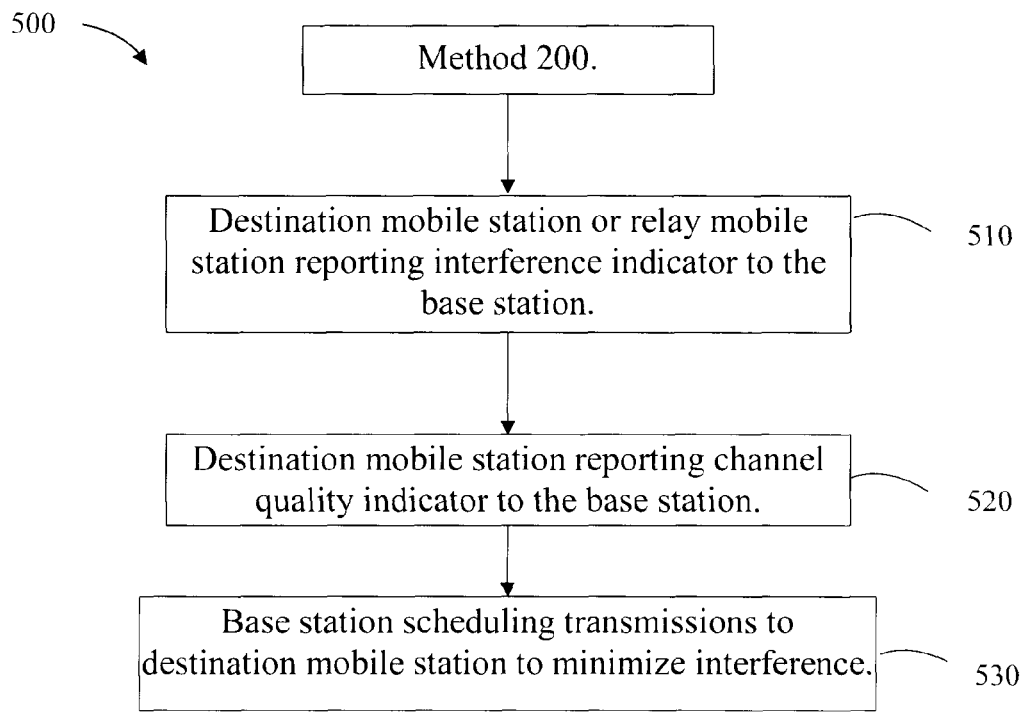
FIG. 5 is a general flow diagram illustrating methods of transmitting packets in wireless communication networks via relay mobile stations according to alternative embodiments of the invention.

Methods according to these embodiments proceed in accordance with the method 200 shown in FIG. 2 followed by the subsequent method steps shown in FIG. 5. At 510, the method 500 comprises the destination mobile station 100-D or the relay mobile station 140 transmitting an interference indicator, such as an interference report, to the base station 110. The method comprises the destination mobile station 100-D listening to the uplink transmissions and, at 520, the destination mobile station reporting a channel quality indicator to the base station 110 if the channel quality for a link between an uplink mobile station and the destination mobile station is above a predetermined threshold. The threshold is predetermined to account for situations in which the channel quality is sufficient that interference on that link needs to be mitigated against.

The method 500 further comprises, for a time sharing scheme comprising no combined decoding, determining the relay mobile station that provides an optimal route based on theoretical channel capacities according to Equation 1 above. In embodiments in which combined encoding is employed, Equation 2 above can be used. However, according to the embodiments in which the relay mobile station shares an uplink slot with an uplink transmission from another mobile station, the threshold specified in Equations 1 and 2 is predetermined to compensate for both the overhead of the relay mobile station and interference from the uplink transmission.

At 530, the method 500 further comprises the base station 110 scheduling transmissions to the destination mobile station 100-D via a relay mobile station 140 to minimize interference with uplink transmissions from another mobile station. For example, if the uplink transmission from the mobile station 100 causes strong interference with reception by the destination mobile station 100-D of the transmission from the relay mobile station 140, the base station 110 does not schedule the relay transmission to the destination mobile station 100-D and the uplink transmission from the mobile station 100 in the same time and frequency.

Figure 6:
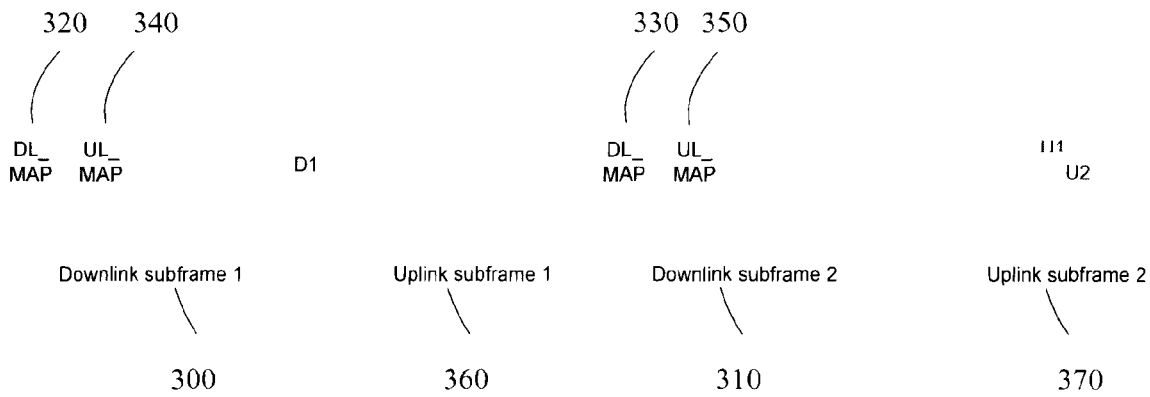
FIG. 6 is a schematic subframe diagram illustrating some alternative embodiments of the present invention.

FIG. 6 shows the corresponding subframe diagram for scenarios where the relay mobile station shares an uplink slot with an uplink transmission from another mobile station 100. FIG. 6 shows first and second downlink subframes 300, 310 comprising respective downlink maps 320, 330, respective uplink maps 340, 350 and first and second uplink subframes 360, 370. In this scenario, the uplink map 340 schedules the uplink transmission U1 for the destination station 100-D that occurs in the same time and frequency as the uplink transmission U2 from the mobile station 100.

For embodiments of the present invention, the downlink and uplink maps can be kept intact and the resource allocation rule is the same as in the IEEE 802.16e standard. Also, the relay transmission uses the same signal format as normal uplink transmissions. However, a new type of connection ID (CID) is added for relay transmission. Also, one entry in the capability field needs to be added to the capability table in IEEE 802.16e. The entry specifies that the destination mobile station 100-D can receive uplink signals. Since both the uplink and downlink employ OFDMA in 802.16e, this capability adds no cost to the destination mobile station 100-D.

Figure 7:
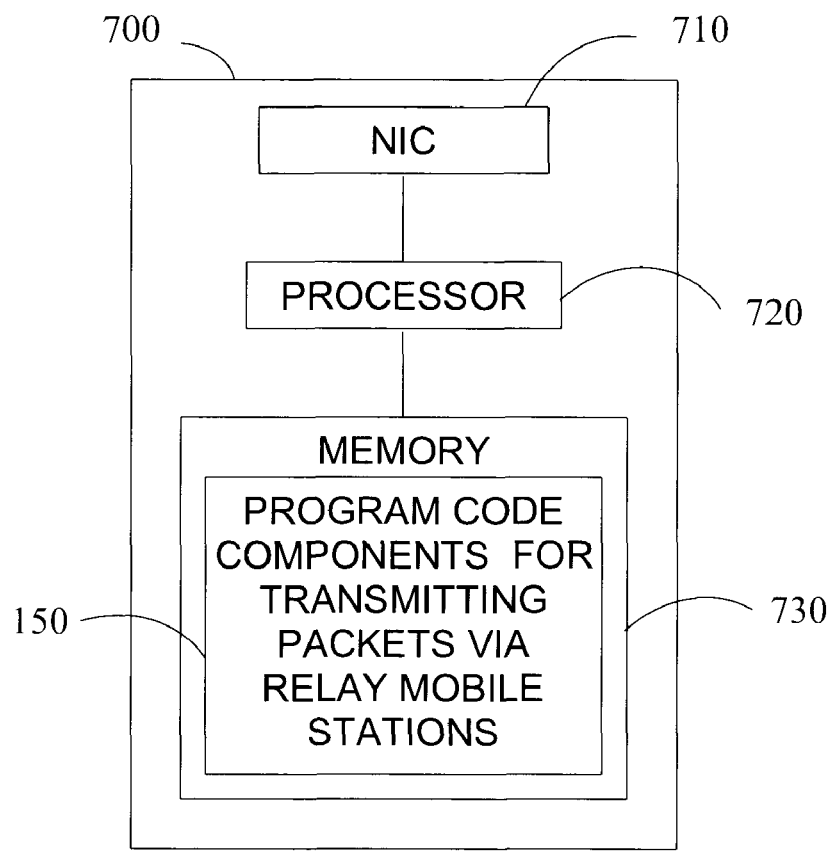
FIG. 7 is a schematic diagram illustrating components of an apparatus for packet transmission in wireless communication networks via relay mobile stations according to embodiments of the invention.

With reference to FIG. 7, a schematic diagram illustrates some of the components of an apparatus 700 in the form of the wireless communication devices 100, 100-D, 110, and 140 according to some embodiments of the present invention. Each apparatus 700 can comprise a physical wireless Network Interface Card (NIC) 710 coupled to a processor 720, such as a standard microprocessor, ASIC, FPGA or the like for implementing embodiments of the invention as described herein. For example, processor 720 can be operatively coupled to a storage medium in the form of a memory 730. The memory 730 comprises a computer-readable medium, such as a random access memory (e.g., static random access memory (SRAM), or synchronous dynamic random access memory (SDRAM)), read only memory (e.g., programmable read only memory (PROM), or electrically erasable programmable read only memory (EEPROM)), or hybrid memory (e.g., FLASH), or other types of memory suitable for such type of storage, as is well known in the art. The computer-readable medium comprises computer-readable program code components 150 for transmitting packets in wireless communication networks via relay mobile stations in accordance with the teachings of the present invention, at least some of which are selectively executed by the processor 720 and are configured to cause the execution of the embodiments of the present invention described herein.

Advantages of the various embodiments of the present invention thus include using mobile stations in wireless communication networks as relays rather than base stations. The number of relay stations is therefore typically greater than in the IEEE 802.11j standard enabling embodiments of the present invention to offer higher throughput than the infrastructure relay standard. Embodiments of the present invention meet the proposed IEEE 802.16m requirements, thus making it compatible with WiMAX 2. Embodiments of the present invention are also compatible with 802.11j and 802.16e and provide a doubling of the 802.16e spectrum efficiency. Interference is minimized and implementation has minimal impact on the 802.16 standard.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense and all such modifications are intended to be included within the scope of the present invention. The benefits, advantages, solutions to problems, and any elements that may cause any benefit, advantage, or solution to occur or become more pronounced are not to be construed as critical, required, or essential features or elements of any or all of the claims. The invention is defined solely by the appended claims including any amendments made during the pendency of this application and all equivalents of those claims.

What is claimed:

1. A method, comprising:
    transmitting packets in a wireless communication network comprising;
        at least one relay mobile station measuring channel quality between the relay mobile station and a destination mobile station in response to a request for at least one relay mobile station from a base station, each relay mobile station operating as a mobile station in the wireless communication network;
        the relay mobile station reporting a channel quality indicator to the base station if a channel quality for a link between the base station and the destination mobile station via the relay mobile station is greater than a predetermined channel quality; and
        the base station determining the relay mobile station that provides an optimal route for transmitting the packets from the base station to the destination mobile station based on the following equation:

$$\frac{1}{CC(BS \to D)} - \frac{1}{CC(BS \to R) + CC(BS \to D)} - \frac{1}{CC(R \to D)} > \text{threshold}$$

in which the threshold is predetermined to compensate for the overhead of the relay mobile station, $CC(BS \to D)$ refers to the theoretical channel capacity for a communication link between the base station and the destination mobile station, $CC(BS \to R)$ refers to the theoretical channel capacity for a communication link between the base station and the relay mobile station, $CC(R \to D)$ refers to the theoretical channel capacity for a communication link between the relay mobile station and the destination mobile station.

2. The method of claim 1, further comprising the base station broadcasting identifiers of the destination mobile stations for which a relay mobile station is required.

3. The method of claim 1, further comprising broadcasting a channel quality indicator for a direct link between the base station and each destination mobile station for which a relay mobile station is required.

4. The method of claim 1, wherein the predetermined channel quality is the channel quality for a direct link between the base station and the destination mobile station.

5. The method of claim 1, further comprising the destination mobile station or the relay mobile station transmitting an interference indicator to the base station where the relay mobile station shares an uplink slot with an uplink transmission from another mobile station.

6. The method of claim 1, wherein the relay mobile station shares an uplink slot with an uplink transmission from another mobile station.

7. The method of claim 5, further comprising the base station scheduling transmissions to the destination mobile station via a relay mobile station to minimize interference with uplink transmissions from another mobile station.

8. The method of claim 1, further comprising the destination mobile station reporting a channel quality indicator to the base station if the channel quality for a link between an uplink mobile station and the destination mobile station is above a predetermined threshold.

9. A relay mobile station for transmitting packets in a wireless communication network including:
measuring channel quality between the relay mobile station and a destination mobile station in response to a request for at least one relay mobile station from a base station, the relay mobile station operating as a mobile station in the wireless communication network, and the base station determining the relay mobile station that provides an optimal route for transmitting the packets from the base station to the destination mobile station based on the following equation:

$$\frac{1}{CC(BS \rightarrow D)} - \frac{1}{CC(BS \rightarrow R) + CC(BS \rightarrow D)} - \frac{1}{CC(R \rightarrow D)} > \text{threshold}$$

in which the threshold is predetermined to compensate for the overhead of the relay mobile station, $CC(BS \rightarrow D)$ refers to the theoretical channel capacity for a communication link between the base station and the destination mobile station, $CC(BS \rightarrow R)$ refers to the theoretical channel capacity for a communication link between the base station and the relay mobile station, $CC(R \rightarrow D)$ refers to the theoretical channel capacity for a communication link between the relay mobile station and the destination mobile station; and
reporting a channel quality indicator to the base station if the channel quality for a link between the base station and the destination mobile station via the relay mobile station is greater than a predetermined channel quality.

10. The relay mobile station of claim 9, further comprising the destination mobile station or the relay mobile station transmitting an interference indicator to the base station in response to a request from the base station where the relay mobile station shares an uplink slot with an uplink transmission from another mobile station.

11. An article comprising: a non-transitory computer-readable medium having stored thereon instructions that, if executed, result in at least the following:
transmitting packets in a wireless communication network between a base station and a destination mobile station;
measuring at least one relay mobile station channel quality between the relay mobile station and the destination mobile station in response to a request for at least one relay mobile station from the base station, each relay mobile station operating as a mobile station in the wireless communication network;
reporting by the relay mobile station a channel quality indicator to the base station if a channel quality for a link between the base station and the destination mobile station via the relay mobile station is greater than a predetermined channel quality; and
determining at the base station the relay mobile station that provides an optimal route for transmitting the packets from the base station to the destination mobile station based on the following equation:

$$\frac{1}{CC(BS \rightarrow D)} - \frac{1}{CC(BS \rightarrow R) + CC(BS \rightarrow D)} - \frac{1}{CC(R \rightarrow D)} > \text{threshold}$$

in which the threshold is predetermined to compensate for the overhead of the relay mobile station, $CC(BS \rightarrow D)$ refers to the theoretical channel capacity for a communication link between the base station and the destination mobile station, $CC(BS \rightarrow R)$ refers to the theoretical channel capacity for a communication link between the base station and the relay mobile station, $CC(R \rightarrow D)$ refers to the theoretical channel capacity for a communication link between the relay mobile station and the destination mobile station.

12. The article of claim 11, further comprising broadcasting by the base station identifiers of the destination mobile stations for which a relay mobile station is required.

13. The article of claim 11, further comprising broadcasting a channel quality indicator for a direct link between the base station and each destination mobile station for which a relay mobile station is required.

14. The article of claim 11, further comprising causing the predetermined channel quality to be the channel quality for a direct link between the base station and the destination mobile station.

15. The article of claim 11, further comprising transmitting by the mobile station or the relay mobile station an interference indicator to the base station where the relay mobile station shares an uplink slot with an uplink transmission from another mobile station.

16. The article of claim 11, wherein the relay mobile station that provides an optimal route.

17. The article of claim 16, further comprising scheduling by the base station transmissions to the destination mobile station via a relay mobile station to minimize interference with uplink transmissions from another mobile station.

18. The article of claim 11, further comprising reporting by the mobile station a channel quality indicator to the base station if the channel quality for a link between an uplink mobile station and the destination mobile station is above a predetermined threshold.

* * * * *